(12) United States Patent  (10) Patent No.: US 8,151,737 B1
Alonzo et al.  (45) Date of Patent: Apr. 10, 2012

(54) PET LEASH

(76) Inventors: Reynaldo V. Alonzo, Fresno, CA (US); Nina Seyedabadi, Fresno, CA (US)

( * ) Notice: Subject to any disclaimer, the term of this patent is extended or adjusted under 35 U.S.C. 154(b) by 0 days.

(21) Appl. No.: 12/818,796

(22) Filed: Jun. 18, 2010

(51) Int. Cl.
*A01K 27/00* (2006.01)
(52) U.S. Cl. .......................... 119/799; 119/798
(58) Field of Classification Search .................. 119/799, 119/792, 795, 798, 787
See application file for complete search history.

(56) References Cited

U.S. PATENT DOCUMENTS

| | | | |
|---|---|---|---|
| 2,337,970 A | 12/1943 | Cassell | |
| 2,911,947 A * | 11/1959 | Kramer | 119/798 |
| 3,870,296 A | 3/1975 | Ellis | |
| 3,910,234 A * | 10/1975 | Henson | 119/774 |
| 4,499,855 A * | 2/1985 | Galkiewicz | 119/708 |
| 4,522,153 A * | 6/1985 | Vander Horst | 119/799 |
| 4,735,035 A * | 4/1988 | Mattioli | 54/34 |
| 4,738,222 A * | 4/1988 | Terry et al. | 119/781 |
| 4,887,552 A | 12/1989 | Hayden | |
| 5,291,856 A * | 3/1994 | Goller | 119/795 |
| D362,519 S * | 9/1995 | Jacobsen et al. | D30/153 |
| 5,474,032 A * | 12/1995 | Krietzman et al. | 119/708 |
| 5,526,774 A * | 6/1996 | Swindall et al. | 119/787 |
| D389,612 S | 1/1998 | Jacobsen | |
| D389,614 S | 1/1998 | Jacobsen | |
| 5,740,764 A * | 4/1998 | Jacobsen | 119/798 |
| 5,803,017 A * | 9/1998 | Stewart | 119/799 |
| 6,053,129 A | 4/2000 | Akre | |
| 6,247,428 B1 * | 6/2001 | Mireles | 119/795 |
| 6,318,300 B1 * | 11/2001 | Renforth et al. | 119/708 |
| 6,662,751 B1 * | 12/2003 | Rutter | 119/400 |
| 7,028,641 B1 * | 4/2006 | Martin | 119/791 |
| 7,726,261 B2 * | 6/2010 | Everhart | 119/795 |
| 7,805,816 B1 * | 10/2010 | Thorne et al. | 24/301 |
| 7,886,700 B2 * | 2/2011 | Glazer | 119/796 |
| 7,984,698 B1 * | 7/2011 | Collins | 119/780 |

* cited by examiner

*Primary Examiner* — Yvonne Abbott
(74) *Attorney, Agent, or Firm* — Kenneth L Tolar

(57) ABSTRACT

A pet leash includes an elongated shaft formed of an inner core of bendable but extremely resilient tubing similar to that used to construct certain tent frames. The tubing is encapsulated by a cylindrical foam layer and an outer hollow sleeve that minimize impact with surrounding objects when the shaft is flexed and suddenly released. At an upper end of the shaft is a handle formed of a length-adjustable strap with a loop attached thereto. A clip at the lower end of the shaft is releasably securable to either a pet collar or an adjustable yoke. The resilient-but-flexible shaft easily bends around trees and similar obstructions but returns to an original, linear configuration when a stressing force is removed to prevent entangling.

5 Claims, 3 Drawing Sheets

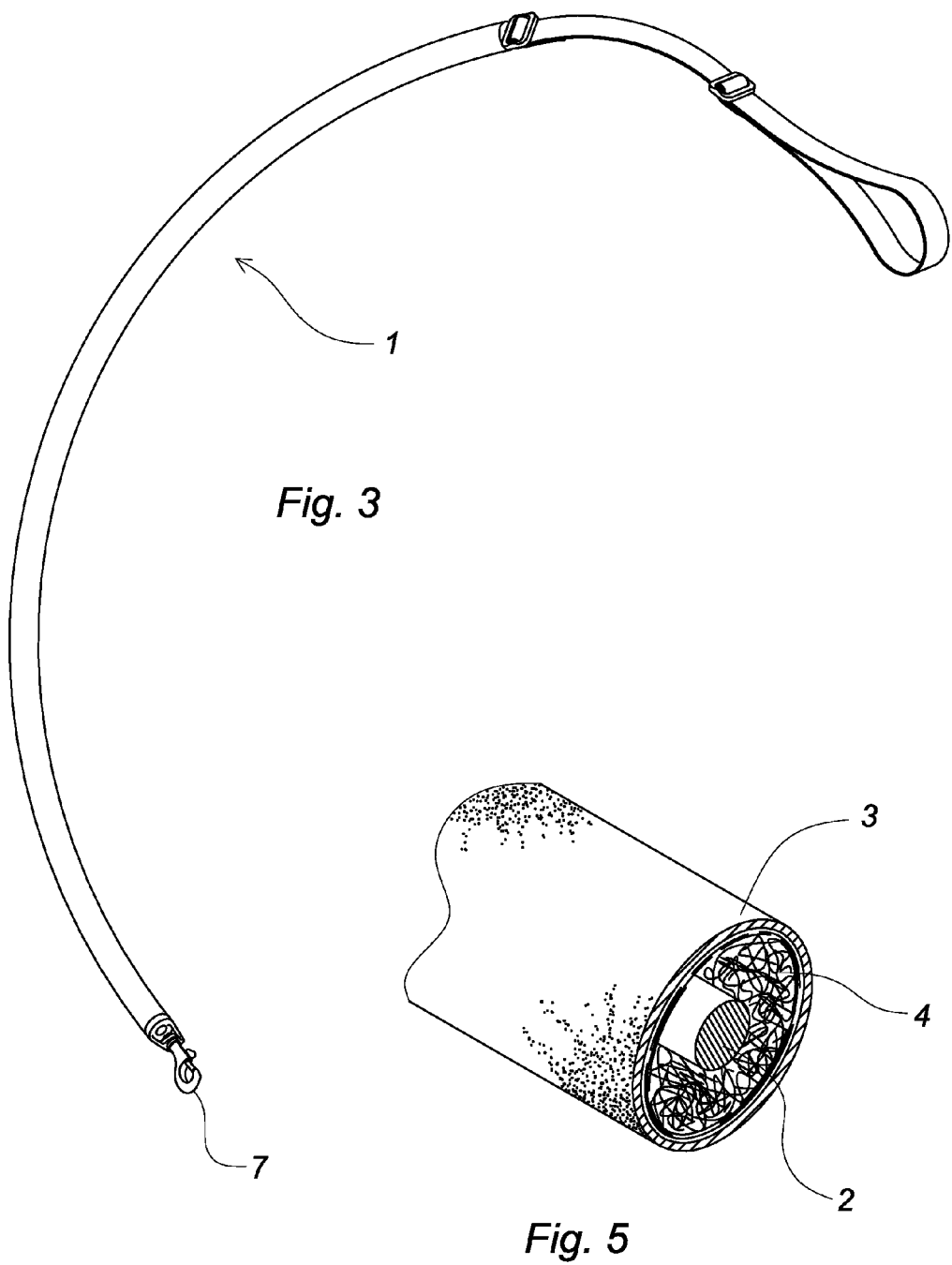

PET LEASH

CROSS REFERENCE TO RELATED APPLICATIONS

None.

BACKGROUND OF THE INVENTION

The present invention relates to a bendable, resilient pet leash that circumvents obstructions when stressed, but returns to a rigid, linear configuration when stress is removed to prevent entangling with surrounding objects.

DESCRIPTION OF THE PRIOR ART

Conventional pet leashes are typically constructed with pliable fabric or chain links that sag whenever the leash is not completely extended. The resulting slack either drags the ground or easily entangles with the pet, the pet owner and/or nearby objects. The problem is exacerbated whenever the pet circumvents a tree, a pole, a shrub or a similar upstanding obstruction; the pet often wraps the leash around the obstruction and forms it into a knot that must be untangled. Accordingly, there is currently a need for a pet leash that overcomes the above-described problems associated with conventional leashes.

A review of the prior art reveals a myriad of pet leashes. For example, U.S. Pat. No. 6,053,129 issued to Akre discloses a leash formed of a bungee cord received within a hollow tube that allows an animal to stretch the leash slightly with minimal discomfort.

U.S. Pat. No. 5,803,017 issued to Stewart discloses an animal leash formed of a short, stiff rod having a cord at one end and a handle at an opposing end. The rod is formed of a resilient material that bends but returns to an original orientation when a flexing force is removed. The leash is designed to minimize slack in an intermediate portion of the leash that could entangle with the animal.

U.S. Pat. No. 3,870,296 issued to Ellis discloses a novelty leash that falsely implies that the user is walking a dog.

U.S. Pat. No. 4,887,552 to Hayden discloses an electrically-lighted leash.

U.S. Pat. No. 2,337,970 issued to Cassell discloses a dog leash including a pair of spring-biased, telescoping tubes having a chain at one end and a handle at an opposing end. The tubes extend and retract to provide a dog with a limited amount of freedom.

U.S. Pat. Nos. D389,614 and D389,612 issued to Jacobsen disclose an ornamental design for an animal leash.

As indicated above, numerous pet leashes exist in the prior art. Although the patent issued to Stewart discloses a dog leash having a rod that returns to an original configuration when flexed, the device includes a cord at an end of the rod with a buckle at a distal end of the cord that fastens to a dog collar. Accordingly, because the cord/rod combination of Stewart is primarily designed to prevent excess slack within an upper or intermediate portion of a leash that would otherwise sag and trip a dog, it does not prevent entangling with trees and other objects if wrapped thereabout. Conversely, the entire length of the leash according to the present invention is formed of a resilient but slightly pliable material so as not to entangle with trees, poles, shrubs and similar upstanding objects.

SUMMARY OF THE INVENTION

A pet leash includes an elongated shaft formed of an inner core of bendable but extremely resilient tubing similar to that used to construct certain tent frames. The tubing is encapsulated by a cylindrical foam layer and an outer hollow sleeve that minimize impact with surrounding objects when the shaft is flexed and suddenly released. At an upper end of the shaft is a handle formed of a length-adjustable strap with a loop attached thereto. A clip at the lower end of the shaft is releasably securable to either a pet collar or an adjustable yoke. The resilient-but-flexible shaft easily bends around trees and similar obstructions but returns to an original, linear configuration when a stressing force is removed to prevent entangling.

It is therefore an object of the present invention to provide a pet leash that does not entangle with nearby objects.

It is another object of the present invention to provide a pet leash constructed with a resilient material that bends when flexed but returns to an original, rigid configuration when a stressing force is removed.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 depicts the leash in a flexed position.

FIG. 5 is a sectional view of the shaft depicting the internal components thereof.

DESCRIPTION OF THE PREFERRED EMBODIMENT

Figure 1:
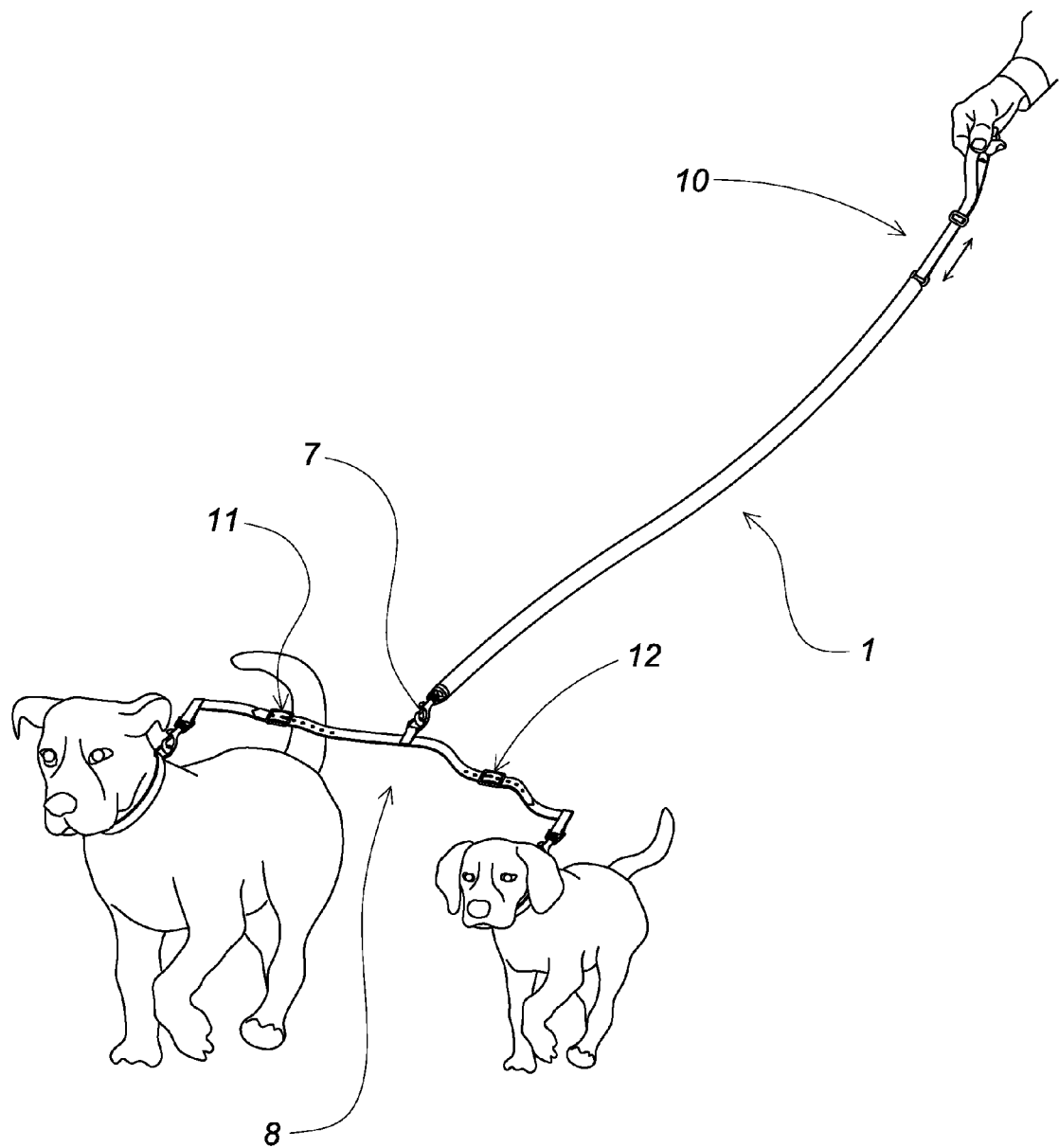
FIG. 1 is a perspective view of the leash according to the present invention tethered to a pair of animals.
Figure 4:
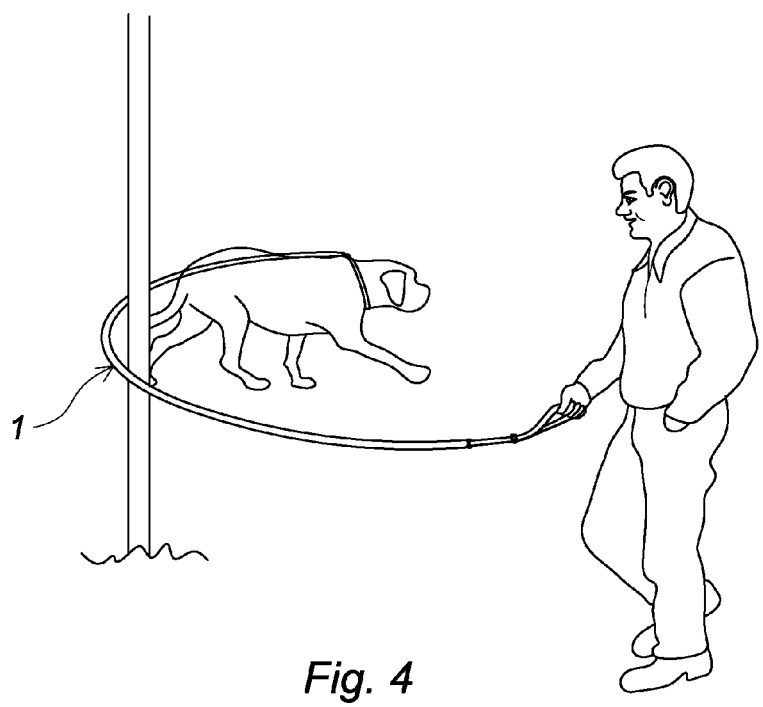
FIG. 4 depicts the leash attached to an animal that is circumventing a pole.
Figure 2:
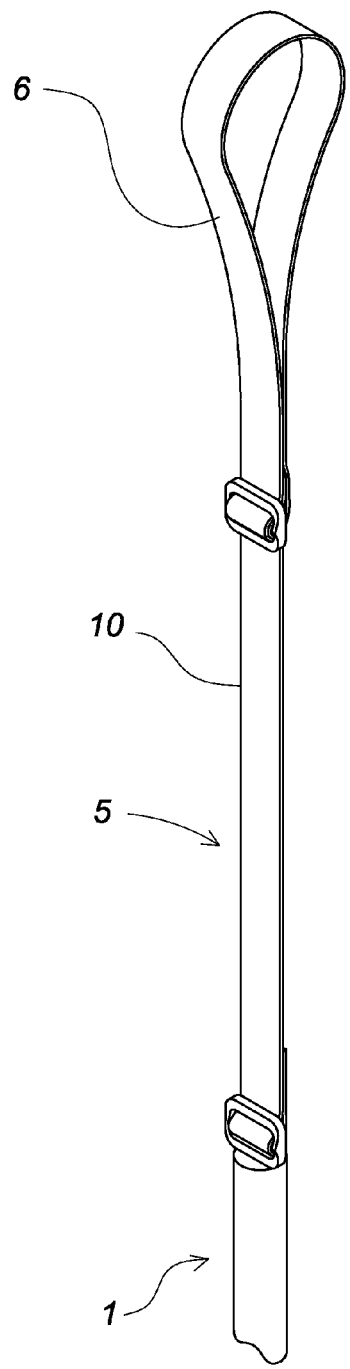
FIG. 2 is an isolated view of the upper end of the leash.

A pet leash includes an elongated shaft 1 formed of an inner core of bendable, but extremely resilient tubing 2 constructed of carbon fiber, graphite, fiberglass or a similar material that is often used to construct flexible tent frames. As such, when a stressing force is applied to the tubing, it will assume an arcuate configuration as depicted in FIGS. 3 and 4, but will return to an original, substantially-linear configuration when the stressing force is removed. The tubing is encapsulated by a hollow, fabric sleeve 3 with a cylindrical foam layer 4 disposed therebetween. The foam layer minimizes any impact with nearby objects or persons that could occur when the shaft is flexed and suddenly released.

At an upper end of the shaft is a handle 10 formed of a length-adjustable strap 5 with a loop 6 attached thereto that a user grasps when walking a pet. The strap may have longitudinally-disposed apertures thereon that each selectively receive a belt-buckle-type latch pin to vary the length of the strap. A releasable clip 7 on a lower end of the shaft is securable to either a dog collar or an adjustable yoke 8 for tethering multiple animals. The clip 7 may also be attached to a small, length-adjustable strap.

The yoke includes an elongated spine having a left segment 11 and a right segment 12, each having a buckle, sleeve or a similar adjustment means at its distal end allowing a user to independently vary the length of each segment. For example, a first segment could be lengthened to tether a taller animal while the other segment could be shortened to simultaneously tether a smaller animal. At a distal end of each segment is a releasable clip for securing to a loop on a pet collar.

As is readily apparent from the detailed description provided above, the flexible but extremely resilient tubing easily bends around trees and similar obstructions but returns to an original, linear configuration when a stressing force is removed. Because the shaft maintains a rigid, arched or linear orientation, the leash does not entangle with surrounding objects, even in the absence of an axial or angular force.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A pet leash comprising:

an elongated shaft having an upper end and a lower end, said shaft formed of a hollow, fabric sleeve, an inner core of bendable but extremely resilient tubing received within said sleeve and a cylindrical, foam layer disposed between said core and said sleeve for minimizing impact with nearby objects and persons when said shaft is flexed and suddenly released;

a handle at the upper end of the shaft;

means for securing the lower end of the shaft to an animal whereby said shaft easily circumvents an obstruction while maintaining a taut, rigid orientation to prevent entangling with said obstruction and other nearby objects.

2. The leash according to claim 1 wherein said handle comprises a length-adjustable strap with a loop attached thereto.

3. The leash according to claim 1 wherein said means for securing the lower end of the shaft to an animal comprises a releasable clip on a lower end of the shaft that is securable a pet collar.

4. The leash according to claim 3 further comprising an adjustable yoke securable to said clip for tethering multiple animals.

5. The leash according to claim 4 wherein said yoke includes an elongated spine having a first segment and an opposing second segment, each of said first segment and said second segment having an adjustment means for independently varying a length of each segment;

means for securing a distal end of each segment to an animal to allow a user to simultaneously tether multiple animals.

\* \* \* \* \*